Aug. 31, 1948.　　M. E. AMES, JR., ET AL　　2,448,069
SAW TOOTH GENERATOR WITH AUTOMATIC
AMPLITUDE CONTROL
Filed Aug. 30, 1944　　3 Sheets-Sheet 1
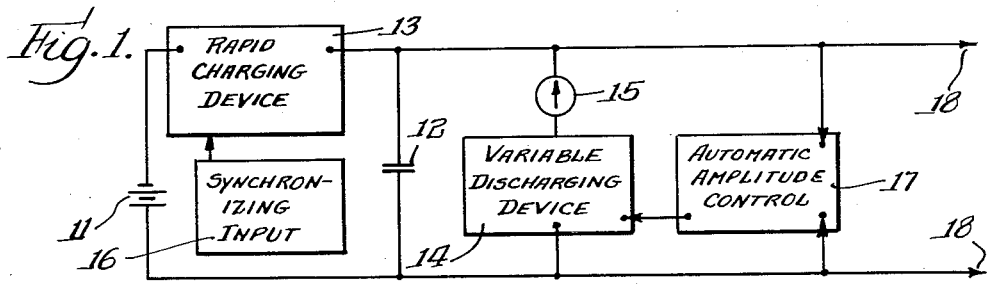
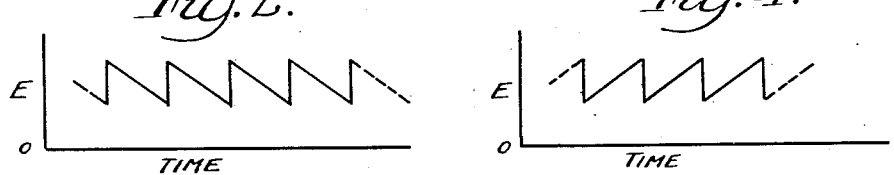
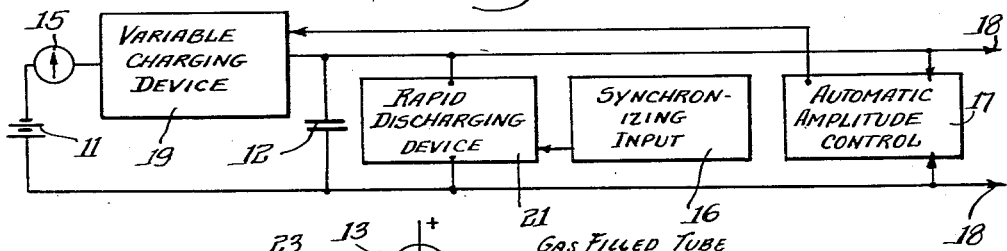
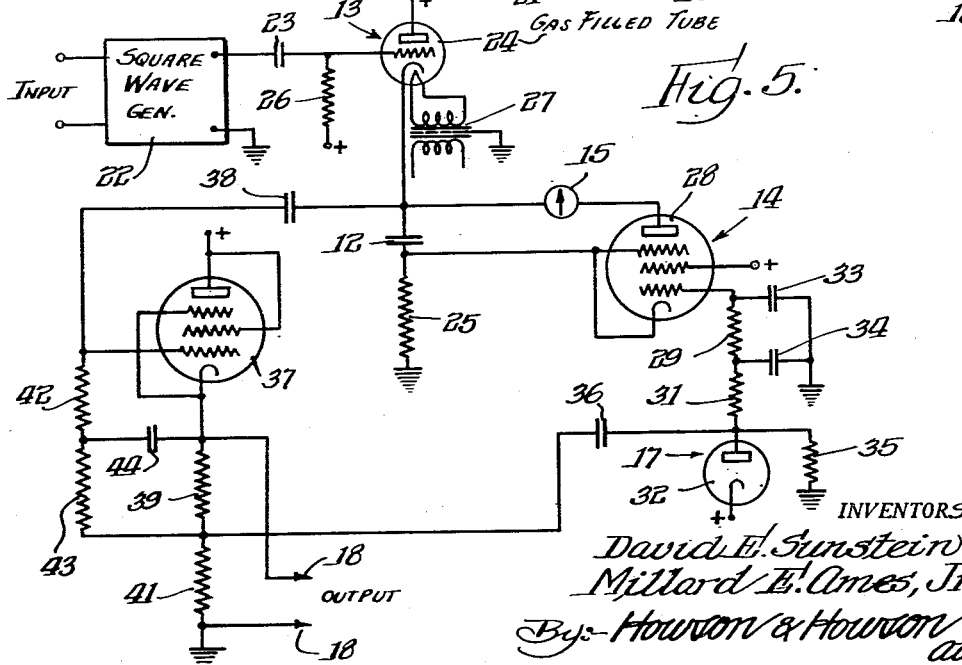
INVENTORS
David E. Sunstein
Millard E. Ames, Jr.
By: Howson & Howson
attys

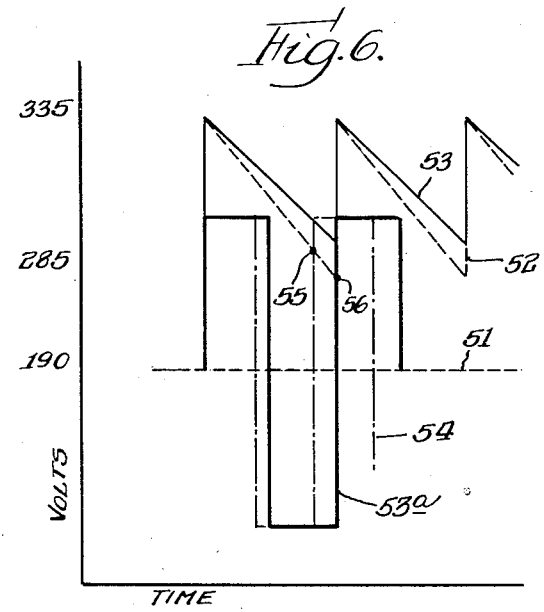
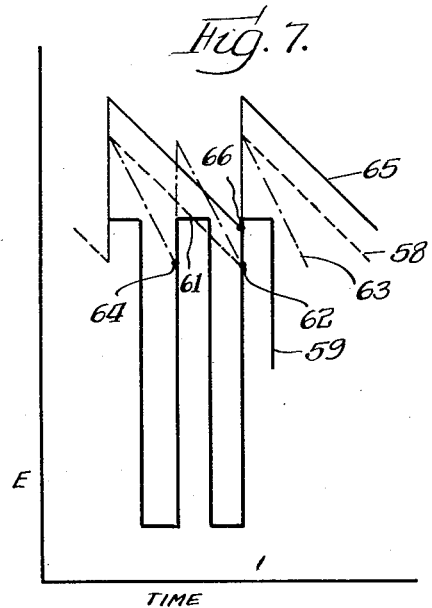
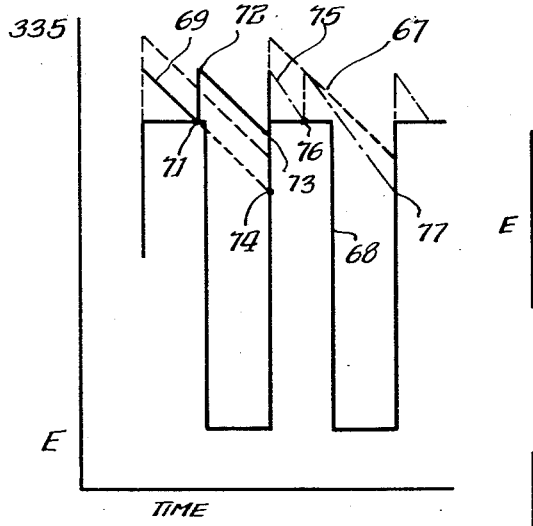
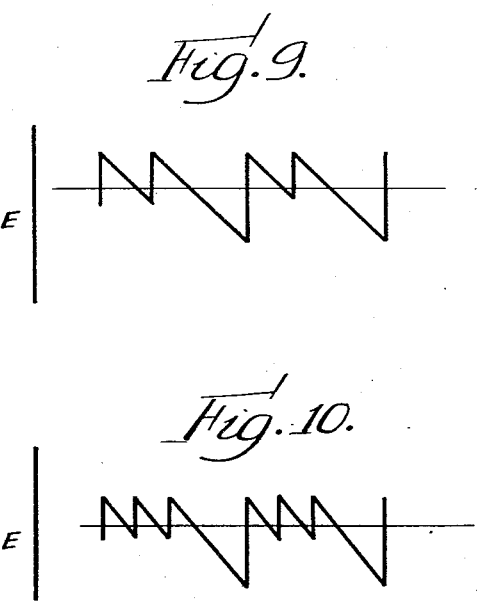

Fig. 11.

Patented Aug. 31, 1948

2,448,069

UNITED STATES PATENT OFFICE 2,448,069

SAW-TOOTH GENERATOR WITH AUTOMATIC AMPLITUDE CONTROL

Millard E. Ames, Jr., Germantown, and David E. Sunstein, Elkins Park, Pa., assignors to Philco Corporation, Philadelphia, Pa., a corporation of Pennsylvania Application August 30, 1944, Serial No. 551,948

22 Claims. (Cl. 250—36)

1

The present invention relates to an automatically synchronized saw tooth generator, and more particularly to such generator for use as a time axis generator of an oscilloscope.

Saw tooth generators have numerous applications, one of which is for a timing axis for an oscilloscope. For certain applications the saw tooth generator is of the type which is synchronized with another operation as in the case of television systems, vibration, acoustics and speech investigations and studies, and the like. Where the synchronization is to occur in response to a variable frequency input it has been necessary to provide the required number of manual controls to adjust the operation of the saw tooth to the generator. In some cases such manual controls have been rather large in number and have required considerable skill in adjusting in order to provide the desired operation. It, therefore, would be desirable to provide a saw tooth generator which would be automatically synchronized to respond to variations in frequency of the initiating voltage or impulses and which has a wide range of operation over the desired band of frequencies and which provides a saw tooth wave having an amplitude independent of the frequency.

In accordance with the present invention a saw tooth generator is provided which has an automatic amplitude control which maintains the amplitude of the saw tooth output wave independent of the frequency of operation of the saw tooth generator. The automatic amplitude control modifies the operation of a charging device or a discharging device associated with an energy storage circuit so as to obtain the desired output. The charging device may be supplied with the impulses with which the saw tooth is to be synchronized. Such an arrangement will provide a saw tooth voltage for use with a timing signal for oscilloscopes which automatically adjusts itself to provide a steady signal on the cathode ray tube screen even though the signal under study may shift over a wide range of frequencies.

It, therefore, is an object of the present invention to provide a timing axis generator for an oscilloscope which will provide an output wave or signal of substantially constant amplitude independently of the frequency of operation.

Another object of the present invention is to provide a saw tooth generator which may be synchronized with a varying frequency incoming signal, such as speech or music, automatically without manual adjustment.

Still another object of the present invention is

2 to provide an improved arrangement operating as a direct reading frequency meter.

Still another object of the present invention is to provide an improved circuit which may be used as a frequency divider or multiplier.

Other and further objects of the present invention subsequently will become apparent from the following description taken in connection with the accompanying drawings in which Figure 1 is a diagrammatic representation or a block diagram illustrating one embodiment of the present invention;

Figure 2 is a graphical representation explanatory of the operation of Figure 1;

Figure 3 is a block diagram illustrating a different embodiment of the present invention;

Figure 4 is a graphical representation illustrating the operation of Figure 3;

Figure 5 is a circuit diagram illustrating certain details of an arrangement disclosed in the block diagram of Figure 1;

Figure 6 is a graphical representation illustrating the operation of the invention when the frequency of the control of signal wave is changed;

Figure 7 graphically illustrates the operation at a sub-harmonic frequency of the incoming signal;

Figure 8 illustrates the operation as a frequency multiplier;

Figures 9 and 10 illustrate the operation when the invention is used to generate waves having harmonics in accordance with a desired pattern; and Figure 11 is another circuit diagram illustrating another modification of the system shown in Figure 5 which is suitable for a multiwave generation similar to that illustrated by the graphical representation set forth in Figure 7.

Referring to Figure 1 of the drawing there is shown one embodiment of the present invention having a source of potential 11 which may comprise a direct current source or battery, or a synchronizing signal subsequently to be described. The source 11 is arranged to supply a potential to the capacitor 12 through a charging circuit 13. A discharging circuit for the capacitor 12 is provided which includes a discharging device 14 connected in series with a meter 15 which may serve to indicate the frequency of the incoming signal. The incoming signal has been indicated by the rectangle 16 associated with the charging circuit 13. The discharging device or circuit 14 is controlled by an automatic amplitude control system 17 which is responsive to the voltage appearing across the output terminals 18. In the arrangement shown in Figure 1 a capacitor 12 is rapidly charged for each cycle of the incoming synchronizing signal obtained from the source 16. The source 16 may be a laboratory type of oscillator. The capacitor 12 is charged from the source 11 by the rapid charging device 13. After the capacitor 12 has been charged, the rapid charging device 13 disconnects the source 11 from the capacitor 12 to permit the discharging device 14 to discharge the capacitor through the direct current meter 15. Preferably the discharge device 14 is arranged to discharge the capacitor at a constant rate for any given value of the rate of discharge as determined by the action of the automatic amplitude control system, 17. When the capacitor 12 has been discharged, or partially discharged, the cycle is repeated. The operation causes an output voltage to appear across the terminals 18 which is represented by Figure 2. It will be noted that the voltage across the capacitor 12 rises rapidly and then discharges at a relatively slow rate. The representation shown in Figure 2 illustrates the saw tooth wave obtained where the operation is repeated continuously as is the case when a signal of constant frequency is applied to the charging circuit or is applied in place of the voltage source 11. It will be appreciated that there is thus generated a saw tooth wave of the usual type providing a linear time base for an oscilloscope. For each constant frequency input the automatic amplitude control system 17 operates to produce a wave similar to that shown in Figure 2.

The action of the automatic amplitude control system 17 permits the production of waves of the type shown in Figure 2 over a wide range of frequencies as contrasted to prior devices which were capable only of operating satisfactorily over a limited frequency range. The automatic amplitude control maintains the amplitude of the generated saw tooth wave substantially constant over this wide range of frequencies and hence there is no rapid change in amplitude as the frequency is changed or varied.

Figure 3 shows another embodiment of the present invention wherein reference characters similar to those shown in Figure 1 are applied to elements or devices having similar functions or operation to the elements shown in Figure 1. It will be noted that a source of energy 11 is connected in series with the direct current meter 15 and the variable charging device 19 to charge the capacitor 12. The device 19 is a variable charging device as contrasted to a rapid charging device 13 used in Figure 1. The capacitor 12 is discharged through a rapid discharging device 21 as compared to a variable discharging device 14 of Figure 1. The synchronizing input 16 is connected to control the rapid discharging device 21. The automatic amplitude control 17 controls the operation of the variable charging device 19. The capacitor 12 in the arrangement shown in Figure 3 is slowly charged and rapidly discharged so that the saw tooth wave appearing across the terminals 18 may be represented by the curve shown in Figure 4. The amplitude control 17 again maintains the limits between the charged and discharged voltages of the capacitor 12 relatively constant so that the amplitude of the output wave remains constant. Upon application of the synchronizing input voltage 16 to the rapid discharging device, the discharging device 21 causes the capacitor 12 to be rapidly discharged whereupon the variable charging device then relatively slowly charges the capacitor. This cycle of operation is repeated for each synchronizing impulse.

In the arrangement shown in Figure 1, an increase in the synchronizing input frequency would tend to produce earlier operation in the cycle because the discharge of the capacitor 12 would not be as complete as at the lower frequency thus tending to reduce the amplitude of the output wave. This tendency is corrected by automatic amplitude control 17 which modifies the rate of discharge of the capacitor 12 so that at the higher frequency the rate of discharge is increased. Thus the amplitude of the output as shown in Figure 2 will tend to remain constant even though the input frequency varies, and hence the phase angle of the incoming signal at which the charging device operates will tend to remain constant thus providing synchronization of a wide range of frequencies. Since the voltage output over the frequency range is very nearly constant, the direct current meter 15 will be deflected substantially directly proportional to the frequency.

In the arrangement shown in Figure 3 an increase of the input frequency will tend to cause the charge on the capacitor 12 to be less complete and hence the amplitude would tend to decrease. This tendency is corrected by the automatic amplitude control 17 which modifies the charging rate so that for the higher frequency the rate of charge is increased. Thus again the amplitude of the output will tend to remain constant as illustrated in Figure 4. Similarly to the arrangement in Figure 1 the direct current meter 15 will be deflected directly proportional to the frequency since the output voltage is maintained constant over the frequency range of operation. Further details as to the manner in which the direct current meter 15 operates as an indication of the frequency of the input signal will become apparent from the detailed operation given in connection with an explanation of the details of a circuit shown in Figure 5.

The circuit shown in Figure 5 shows the details of an arrangement corresponding to the block diagram of Figure 1 wherein the capacitor is charged rapidly, and is discharged relatively slowly at a rate controlled by the amplitude control. Reference characters similar to those used in Figure 1 have been applied to Figure 5 to facilitate the understanding of the relation of the various detailed component parts. The synchronizing signal has been shown applied to a square wave generator 22 capacitively coupled by a capacitor 23 to the grid of an electric valve 24. The square wave generator 22 may be any one of a number of suitable available types, and it is deemed unnecessary to describe the details thereof. For example the square wave generator may consist of an amplifier providing a high amplitude signal corresponding to the input signal which is thereafter followed by a limiter to limit the amplitude to which the signal may rise. The electric valve 24 is connected in series with a capacitor 12 and with a current limiting resistor 25. The current limiting resistor is connected to the negative terminal of a suitable source of anode potential which terminal may be grounded as shown. The positive terminal of the source of potential is connected to the anode of the tube 24. The grid of the tube 24 is connected to a grid resistor 26 which is connected to an intermediate point on the source of anode potential.

In place of a square wave generator 22 controlled by the input circuit, an oscillator may be used. It is also possible to modify the circuit of the electric valve 24 so as to constitute a self-oscillatory circuit which may be controlled in frequency by adjustment of the grid circuit.

The tube 24 constitutes a charging tube and comprises a controlled electric valve which may be a gas-filled grid control tube. Such a gas tube has a characteristic that when the voltage appearing at the grid of the gas tube bears a certain relation to the anode voltage, that current is conducted between the anode and cathode until a certain voltage condition exists whereby the anode voltage drops below a value of the ionizing potential of the medium contained within the envelope of the tube 24. The cathode of the electric valve 24 is of the indirectly heated type, the heater being connected to an isolating transformer 27 provided to prevent leakage between ground and the cathode of the electric valve which would constitute a leakage directly across the capacitor 12. The current limiting resistor 25 has a relatively low value so that the charging of the capacitor 12 occurs almost instantaneously. When the capacitor 12 has become charged, the potential between the anode and the cathode of the tube 24 is reduced so that the tube becomes non-conductive. Sufficient anode potential can be supplied to the tube only upon discharge of the capacitor 12. Conductivity of the tube can only be reestablished by the proper potential being supplied to the grid of the tube.

The discharge system 14 includes a vacuum tube 28 which preferably is of the pentode type having its anode connected to the direct current meter 15 which in turn is connected to one side of the capacitor 12. Pentodes have the characteristic of maintaining substantially constant anode current even though the voltage between the anode and the cathode varies over a substantial range. The pentode 28 is used to discharge the capacitor 12 and hence the cathode and the suppressor grid of the vacuum tube are connected to the other side of the capacitor. The vacuum tube 28 has a screen grid connected to a suitable source of potential, and the control grid which determines the conductivity of the vacuum tube 28 is connected to a circuit controlled by the automatic amplitude control 17. This circuit includes a plurality of resistors 29 and 31 connected between the grid of the vacuum tube 28 and the anode of the diode 32. The resistors 29 and 31 are provided with by-pass capacitors 33 and 34 connected to ground. A leakage resistor 35 is connected between the anode of the diode 32 and ground. The cathode of the vacuum tube is connected to a small positive voltage to provide a certain degree of delay bias. A capacitor 36 is connected to the anode of the diode rectifier tube 32 so that a signal corresponding to the amplitude of the output voltage may be applied. Dependent upon the signal supplied through the capacitor 36 to the anode of the diode rectifier 32, a voltage is developed across the resistor 35 which is supplied through resistor capacitor filter network comprising the resistors 29 and 31 and the capacitors 33 and 34 to the control electrode of the pentode discharge tube 28. The voltage thus applied by the resistor 35 to the control electrode of the vacuum tube 28 controls the rate at which the vacuum tube 28 discharges the capacitor 12. When the anode end of the resistor 35 becomes more negative relative to ground due to the operation of the rectifier 32 in response to increasing signal output, the grid of the vacuum tube 28 will become more negative so as to bring about a slower discharge rate for the capacitor 12.

Between the capacitor 12 and the output terminals 18 there is interposed an isolating stage including a vacuum tube 37, which may also be a pentode. The isolating stage is provided to prevent the control system 17 from having any deleterious effect upon the operation of the capacitor 12. The voltage appearing across the capacitor 12 and the resistor 25 is applied by means of a capacitor 38 to the grid of the vacuum tube 37. The cathode of the vacuum tube 37 is connected to one of the output terminals 18. A voltage divider comprising resistors 39 and 41 is connected between the output terminals 18, and the common juncture between these resistors is connected to the capacitor 36 which supplies a voltage component to the automatic amplitude control tube 32. The grid of the vacuum tube 37 is connected through two resistors 42 and 43 to the common juncture between the resistors 39 and 41, and the common juncture between the resistors 42 and 43 is connected to a capacitor 44 which is connected to the cathode of the vacuum tube 37. The resistor 42 corresponds to a grid resistor and the resistor 43 together with a capacitor 44 constitutes a filter circuit. The isolation stage thus described operates to reduce any load on the capacitor 12 since such load must be made negligible compared to the anode current of the discharge tube 28 if the discharge rate is to be maintained linear. The isolating stage therefore permits the net resistive component of the impedance across the capacitor 12 to be kept at a relatively high value thus permitting the use of a small size capacitor 12 even at low frequencies. By providing a capacitor such as 12 with a small capacitive value, the charging time is short compared to even the highest audio frequency. Therefore at the highest audio frequency the discharge tube 28 is enabled to discharge the capacitor 12 without necessitating the positive bias voltage on its grid.

To facilitate an understanding of the operation of the circuit arrangement shown in Figure 5, certain specific values will be mentioned for the components and the voltages together with an indication of types of tubes which are suitable for a circuit of this type. The tube 24 constituting the charging device is of the control electric valve type which may be a gas-filled tube similar to 884. Such tube has a characteristic that the tube becomes ionized with an anode voltage of three hundred fifty volts if the cathode potential drops below two hundred ninety-seven volts above ground with the grid at two hundred ninety-one volts above ground. Once the tube has become ionized, current will flow through the capacitor 12 and the resistor 25 until the cathode of the gas vacuum tube is at approximately three hundred thirty-four volts at which point there is insufficient potential difference between the anode and cathode to maintain ionization with the grid still at two hundred ninety-one volts above ground. The voltage developed across the resistor 25 during the charging time of the capacitor 12 serves as a negative bias on the control grid of the discharge tube 28 and prevents this discharge tube from drawing current during the charging time of the capacitor 12. This speeds up the charging of the capacitor 12 as compared to the time required if plate current were permitted to flow through the discharge device 28 which also might have additional effect of tending to maintain cathode current in the tube 24 thereby tending to prevent de-ionization from taking place. When the tube 24 has become de-ionized so that no charging current flows through the capacitor 12 and the resistor 25, the vacuum tube 28 will become conductive to discharge the capacitor 12 at a constant rate, which rate depends upon the grid bias on the control grid of the vacuum tube 28. The grid bias supplied to the control grid of the vacuum tube 28 is obtained from the operation of the rectifier 32 and is supplied through the filter network comprising the resistors 29 and 31 and the capacitors 33 and 34. This filter network prevents any ripple voltage from appearing at the grid of the vacuum tube 28 at the lowest frequency at which the apparatus is to operate. The discharge tube 28 may be a pentode such as a 6AC7. The isolating vacuum tube 37 may be a similar type pentode and the diode rectifier 32 may be a 6H6.

With vacuum tubes of the type mentioned as being satisfactory, a sweep amplitude of approximately forty-nine volts will appear across the capacitor 12. If the input signal supplied by the square wave generator 32 to the gas tube 24 appears either before or after the capacitor 12 has reached a value of two hundred eighty-five volts, the resulting sweep voltage produced will be either less or greater than forty-nine volts. This variation in voltage is reflected in the operation of the bias diode 32. The voltage developed from the bias diode 32 varies the voltage supplied to the grid of the discharge tube 28 so as to tend to automatically maintain the flow of current therethrough so as to establish a forty-nine volt change of potential across the capacitor 12 between the maximum and minimum voltages. The sweep obtained is substantially linear with respect to time, and as shown in Figure 2 the charging time of the capacitor 12 is substantially negligible as compared to the discharge time so that the direct current meter 15 will read a current corresponding to the following equation (wherein C, capacitor 12, is chosen as .002 mfd.)

$$i = \frac{dE}{dt}C = \frac{49 \times .002 \times 10^{-6}}{\text{period of 1 cycle}} =$$

$$49 \times .002 \times 10^{-6} \times \text{frequency} = .098f \text{ microamp.}$$

where $f$=saw tooth frequency.

Thus it is apparent that the meter reading is directly proportional to the incoming frequency and hence the circuit arrangement shown may be used as a frequency meter. In a circuit utilizing components of the type mentioned perfect synchronization was obtained with an amplitude change in the output of less than five per cent over a frequency range from seven cycles per second to around fifteen thousand cycles per second. The de-ionization time of the tube 24 at the higher frequencies becomes appreciable, particularly above fifteen thousand cycles per second, and therefore the sweep does not maintain its linearity with respect to time at these frequencies. Synchronization is still maintained to frequencies above seventy kilocycles, which is accompanied by the additional imperfection of an appreciable charging time. At frequencies lower than seven cycles per second the sweep also becomes non-linear and increases in amplitude because the leakage across the capacitor 12 then is of a relatively appreciable value which brings about a discharge of the capacitor so that under such conditions the discharge is not caused solely by the vacuum tube 28. This operation therefore provides positive sychronization over a range of frequencies from less than seven cycles per second to that above seventy kilocycles, and further provides an insignificant amplitude change, or substantially constant output amplitude from seven cycles per second to fifteen thousand cycles per second. The advantage of the present system appears obvious as compared to other systems which usually permit only a ten per cent change in the operating frequency which is accompanied by a ten per cent change in amplitude of the output.

The above system becomes stable in operation upon a sudden change of incoming frequency in a relatively short time. If the incoming frequency is suddenly changed from seven cycles per second to fifteen thousand cycles per second about two seconds are required to reestablish stability. The time required to establish the stability is governed by the rate at which the excess grid bias of the discharge vacuum tube 28 is dissipated. Obviously smaller increases in frequency take a correspondingly smaller amount of time for the automatic control to establish stability. A sudden decrease in the incoming frequency requires a lesser time for the establishment of stability since the grid bias on the vacuum tube 28 can be accumulated quite rapidly. At the expense of sacrificing low frequency performance, the time constants of the filter circuit in the grid circuit of the vacuum tube 28 may be lowered so as to increase the response to variations in the input frequency and thus establish stability in a shorter time interval.

Further features of the circuit arrangement disclosed in Figure 5 will become apparent from the following explanation of the mode of operation taken in conjunction with various figures. In Figure 6 there is represented an operation obtained when the tube 24 is of the 884 type. The curve 53 shows cathode voltage of the tube 24 vs. time. If the frequency of operation should be varied the time axis would have different values, but the voltage values would not be changed since as previously explained the automatic amplitude control operates to maintain the potentials appearing across the capacitor 12 between two definite limits. In the curve shown in Figure 6 there is indicated by a dotted line 51 a grid bias voltage of the gas tube 24. The dotted line 52 shows a critical grid voltage above ground which is obtained from the effective plate voltage of the gas tube equal to the anode voltage minus the cathode voltage. If the grid potential above ground exceeds the dotted curve 52 of Figure 6 then the gas tube 24 will ionize and will conduct current. The grid potential of the tube 24 is equal to the sum of the grid bias plus the output of the square wave generator 22. Thus the solid line 53a shows the applied grid voltage above ground potential. Let it be assumed that the frequency of the output of the square wave generator 22 has been increased so that the voltage supplied is indicated by the dash-dot line 54. Ionization of the gas tube 24 therefore will occur at the point 55 instead of the point 56 thus producing a momentary decrease in the amplitude of the saw tooth output wave. This momentary decrease is detected by the automatic amplitude control 17 which includes the vacuum tubes 28 and 32. The resultant action of these two vacuum tubes will again correct the amplitude of the output wave by changing the rate of discharge of the capacitor 12 so that subsequently ionization will take place at a voltage corresponding to the voltage at the point 56 at a time corresponding to the time of a line intersecting the point 55. From this explanation it is apparent to those skilled in the art how the automatic amplitude control would respond in the event that the input frequency is decreased so as to decrease the frequency of the charge supplied to the capacitor 12.

The previous explanation shows how correction is readily made for a slight change in the controlling or input frequency from which it becomes evident that the time required for the amplitude control to make this correction is relatively short, and previously it has been stated that for a sudden change of considerable difference in frequency, that a greater amount of time would be required. Consideration may now be given to the action occurring when the input frequency is suddenly doubled in frequency. This is illustrated in Figure 7 wherein the dotted line 58 represents the critical grid voltage. The solid line 59 shows that the frequency has been doubled. Upon such change of frequency, ionization now will occur at the point 61 instead of the former point 62, thus shortening the sweep of the amplitude of the saw tooth output wave. As mentioned previously due to the time constants of the filter network between the diode rectifier 32 and the pentode 28 great changes in the input frequency require some time for the automatic amplitude control circuit to stabilize the shift of the critical grid voltage curve so as to restore the amplitude of the saw tooth output wave to its original value. This shift in the critical grid voltage curve is illustrated by the dash-dot line 63 which when stable operation has been obtained will then cause ionization to occur at the point 64 which is at the same voltage level as the initial points 62.

If, however, the time constants of the circuit of the automatic amplitude control system 17 are such that the response is somewhat slow, another form of operation may be brought about. If the critical grid voltage is shifted upwardly as indicated by the solid line 65, which effect may be accomplished by increasing the anode voltage of the tube 24 or by reducing the grid bias on this tube, or by decreasing the bias on the vacuum tube 32 (a reduction in the bias on the rectifier tube 32 will also bring about a reduction in the sweep amplitude), or by reducing the peak positive amplitude of the square wave, and if also the input signal frequency is suddenly doubled, then the critical grid voltage curve 65 is exceeded or crossed by the curve 59 at the point 66. Since the point 66 is at the minimum value of the characteristic curve 65, the automatic amplitude control system 17 will cause no change to be brought about since the amplitude of the output saw tooth wave has not been changed. Thus an operation may be provided whereby the output wave is a sub-multiple of the input signal. By a further upward movement or a shift of the critical grid voltage curve, the saw tooth output wave may have a period which is any desired integral multiple of the period of the input or signal wave.

From the foregoing explanation as to sub-multiple operation given in connection with Figure 7, it will be appreciated that if the input and output frequency originally were ten cycles per second and with the critical grid voltage shifted as heretofore explained, and if then the input frequency were suddenly shifted to one hundred cycles per second, the output frequency would remain ten cycles per second synchronized with the one hundred cycles per second input. If subsequently after the sudden frequency shift a gradual shift were made of input frequency, the output frequency would still preserve the ten to one ratio because the automatic amplitude control would be able to follow this slow change. Thus it will be appreciated that there has been provided a system for sub-multiplication which has considerable advantage over other arrangements, as for instance multivibrators since there never is any possibility of the present system dropping out of synchronization to give an undesired uncontrolled output.

The arrangement shown in Figure 5 may also be so adjusted that the system will give no output if there is no input voltage. Where the tube 24 is of the 884 type, the grid may be biased negatively instead of the positive bias of approximately one hundred ninety volts, and the output of the square wave generator 22 increased proportionately thus producing a frequency sub-multiplier having very great stability of operation.

The system disclosed can also be adjusted so as to provide more than one saw tooth for each incoming cycle provided by the square wave generator 22. This is illustrated graphically in Figure 8 wherein the dotted line curve 67 again illustrates the critical grid voltage, and the solid line 68 illustrates the voltage supplied by the square wave generator 22. If the critical grid voltage curve is shifted downwardly to the solid line representation 69, which is the opposite of the shift suggested in connection with the second explanation presented in connection with Figure 7, ionization will occur at the point 71 whereupon a saw tooth will be generated so that the critical voltage curve rises to the point 72 and again decreases until another intersection is obtained at the point 73. This operation is then repeated so that the output will appear somewhat as shown in Figure 9. At the ionization point 71 of Figure 8 the capacitor 12 will again be charged to its maximum value in spite of the fact that complete discharge has not yet been accomplished. From the point 72 discharge of the capacitor continues until the point 73 is reached which is at a lower value than 71, but not as low as point 74 for which value the automatic amplitude control 17 is adjusted. The control 17 therefore operates to hasten the discharge of the capacitor 12 so that the characteristic curve is shifted to the dash-dot line 75 whereupon ionization again occurs at point 76 and subsequently at point 77 which is a stable condition of operation. This stable condition of operation therefore produces a wave shape such as shown in Figure 9. By a still greater shift of the critical grid voltage curve an operation may be obtained to produce a greater number of small saw teeth during the first half of the input cycle as is illustrated in the curve shown in Figure 10. These smaller saw teeth during the first half of the input cycle will always be equal to or greater than one half of the incoming period if the square wave generator 22 actually produces a truly flat top square wave. If the square wave generator 22 is adjusted so as to provide a positive peak of longer duration than the negative peak, the long saw tooth shown in Figures 9 and 10 can be adjusted to exactly one half period thus producing a form of frequency multiplication which might find application for the production in electronic musical instruments of a sound similar to that produced by a violin.

In Figure 11 the last stage of the square wave generator is shown as having a vacuum tube 81 with its anode capacitively coupled to the grid circuit of the electric valve 24 and its cathode connected through a variable capacitor 82 to the cathode of the electric valve 24. The grid resistor 26a instead of being connected to a fixed potential is connected to a resistor 83 which is by-passed to ground by a capacitor 84, and which resistor is connected to an adjustable contact 85 on a voltage divider 86 so that the voltage supplied to the grid may be varied between certain positive values. The one terminal of the capacitor 12 which is connected to the anode of the discharge tube 28 is coupled by a capacitor 87 to a cathode follower isolating stage including a vacuum tube 88. The vacuum tube 88 is provided with a grid resistor 89 which is by-passed to the cathode by a capacitor 91. Suitable cathode resistors 92 and 93 are connected between ground and the cathode of the vacuum tube 88. The common juncture between the resistors 92 and 93 is connected to one of the output terminals 18a. The grid circuit is completed from the grid resistor 89 through a series resistor 94 to the common juncture between the resistors 92 and 93.

An amplitude control tube 32a has a resistor 35 connected between its anode and ground. A capacitor 36 is connected between the anode of the vacuum tube 32a and the terminal 18a of the output circuit so that the amplitude control tube is energized in accordance with the voltage appearing at the output terminals. The anode of the amplitude control tube 32a is connected through resistors 95 and 96 to the control electrode of the vacuum tube 28. The resistor 96 and the control electrode of the vacuum tube 28 are by-passed to ground through a capacitor 97. The common juncture between the resistors 95 and 96 may be connected by means of a capacitor 98 to the adjustable contact 85 on the voltage divider 86. Alternatively, instead of connecting the common juncture between the resistors 95 and 96 to capacitor 98, it may be connected to a small capacitor 99 arranged to be charged from a suitable source of potential through a resistor 101. A double pole double throw switch 102 may be provided so that the capacitor 99 may be connected between ground and the common juncture of the resistors 95 and 96 to momentarily supply energy to that circuit. This switch 102 preferably is of the spring return push button type so that upon release of the switch the capacitor 99 is connected between ground and the source of potential to which the resistor 101 is connected, whereby the capacitor 99 is again charged.

The adjustable capacitor 82 connected between the cathode of the electric valve 24 and the cathode of the last stage of the square wave generator 22 operates as a square wave neutralizer at the higher audio frequencies. The circuit comprising the resistor 83 and the capacitor 84 constitutes an isolation filter for operation when the control of the system is obtained solely by the connection between the common juncture of the resistors 95 and 96 through the capacitor 98 to the adjustable contact 85 on the voltage divider 86. The capacitor connection including the capacitor 98 provides smooth operation of control 85 for obtaining, with a given input frequency supplied to the square wave generator 22, a decrease in the sweep rate from high frequencies to low frequencies as the contacting arm 85 of resistor 86 is moved toward a less positive potential. Alternatively, by omitting the connection between the capacitor 98 and the common juncture between the resistor 95 and 96 a similar form of operation may be obtained by a control of the adjustable contact 85 on the voltage divider 86 while the operator at the same time is operating the push button switch 102. This produces a form of multiwave generation similar to that heretofore described in connection with Figure 7. It will also be noted that the grid circuit of the discharge vacuum tube 28 does not contain as great a filter circuit as that shown in Figure 5, and hence the time constants between the amplitude control tube 32a and the discharge tube 28 are of a different value.

Whereas in Figure 5 the series resistors between the anode of the amplitude control tube 32 and the grid of the vacuum tube 28 each had a value of about two megohms which were by-passed to ground by .05 microfarad capacitors, the circuit arrangement in Figure 11 employs one megohm resistors and the by-pass capacitor 97 is .2 microfarad. The capacitor 98 may have a value of .5 microfarad. Whereas in Figure 5 the grid resistor 26 had a value of two hundred thousand ohms, the grid resistor 26a in Figure 11 has a value of one hundred thousand ohms. The resistor 83 is series therewith also has a value of one hundred thousand ohms, and the voltage divider 86 may have a value of fifty thousand ohms extending between voltage potentials of one hundred eighty volts and two hundred eighty volts. Where the capacitor 99 is used to control the operation, this capacitor may have a value of .01 microfarad which is charged from a source of potential of approximately one hundred volts.

While for the purpose of describing and illustrating the present invention, certain specific embodiments have been shown in the drawings, and certain types of components have been suggested, it is to be understood that the invention is not to be limited thereby but contemplates such further embodiments or modifications as come within the scope of the appended claims.

This invention is hereby claimed as follows:

1. The combination comprising a source of unidirectional voltage, an energy storage device, a charging device interposed between said storage device and said source of voltage, a discharging device for said storage device, means for measuring the amplitude of the voltage across said storage device, and means responsive to the measured amplitude for varying the rate of energy flow through one of said charging and discharging devices.

2. A source of unidirectional voltage, an energy storage device, means for controlling the charging of said device from said source of voltage, means for controlling the discharging of said device, and means responsive to the voltage across said device for varying the operation of one of said first two means so as to vary the rate of charging or discharging of said device.

3. The combination comprising a source of unidirectional voltage, an energy storage device, means for charging said device from said voltage source, means for discharging said device, and means responsive to the voltage across said device for varying the rate of charging thereof by said charging means.

4. The combination comprising a source of unidirectional voltage, an energy storage device, means for charging said device from said voltage source, means for discharging said device, and means responsive to the voltage of said device for varying the rate of discharge thereof by said discharging means.

5. The combination comprising a source of unidirectional voltage, an energy storage device, means for charging said device from said voltage, means for discharging said device, means responsive to the voltage across said device for varying the rate of energy flow through one of said first two means, and a source of signal energy for controlling the operation of the other of said first two means.

6. The combination comprising a source of unidirectional voltage, an energy storage device, means for charging said device from said source of voltage, means for discharging said device, one of said means having a more rapid rate of operation than the other of said means, means responsive to the voltage across said device for varying the rate of energy flow through the means having the slower rate of operation, and a source of signal energy for controlling the operation of the means having the higher rate of operation.

7. The combination comprising a source of unidirectional voltage, a capacitor, a device for charging said capacitor from said source of voltage, a device for discharging said capacitor, means for varying the rate of energy flow through one of said devices in accordance with the potential difference occurring across said capacitor, and a direct current meter in series with one of said devices.

8. The combination comprising a source of unidirectional voltage, a capacitor, a device for charging said capacitor from said source of voltage, a device for discharging said capacitor, one of said devices having a higher rate of operation than the other of said devices, a source of signal energy for controlling the operation of the device having the higher rate of operation, means responsive to the potential difference appearing across said capacitor for varying the rate of energy flow through the device having the slower rate of operation, and a direct current meter in series with either of said devices.

9. The combination comprising a source of unidirectional voltage, a capacitor, means for charging said capacitor from said source of voltage, means for discharging said capacitor, one of said means having a constant rate of operation, and the other of said means having a variable rate of operation, and means responsive to a variation in amplitude of the potential difference appearing across said capacitor for varying the rate of operation of said variable means so as to maintain substantially constant the amplitude of the potential difference appearing across said capacitor.

10. The combination comprising a source of unidirectional voltage, a capacitor, a device for charging said capacitor from said source of voltage including a controlled electric valve having a critical control voltage characteristic, a device for discharging said capacitor, means responsive to the change of potential appearing across said capacitor for varying the operation of one of said devices, and means for varying the effective critical control voltage characteristic.

11. The combination comprising a source of unidirectional current, an energy storage device, a circuit for charging said device from said source of voltage including a controlled electric valve having a critical control voltage characteristic, a circuit for discharging said device, one of said circuits being arranged to operate at a variable rate, means responsive to the voltage difference appearing across said device for varying the rate of operation of said circuit having the variable rate of operation, a source of signal voltage applied to the other of said circuits for determining the frequency of operation thereof, and means for varying the effective critical control voltage of said controlled electric valve.

12. The combination comprising a source of unidirectional voltage, an energy storage device, a circuit for charging said device including a controlled electric valve having a critical control voltage characteristic, means for supplying to said charging circuit a signal for determining the frequency of operation of said charging circuit, a circuit for discharging said device, one of said circuits being arranged to operate at a constant rate, and the other of said circuits at a variable rate, means responsive to the voltage difference appearing across said device for varying the operation of said circuit having a variable rate of operation, and means for varying the relation between said critical control voltage and said signal voltage to cause said device to be charged and discharged at a frequency having an integral relation to the frequency of said signal source.

13. The combination comprising a square wave generator controlled in accordance with a control signal, a source of unidirectional current, a capacitor, a controlled electric valve, said valve, said capacitor, and said source of voltage being connected in series, means interconnecting the control electrode of said valve with said square wave generator, a discharging circuit for said capacitor including a control vacuum tube, a control circuit for said vacuum tube including a source of biasing voltage, and means including an isolating circuit for supplying to said control circuit a component of the voltage appearing across said capacitor, said control circuit being arranged to vary the rate of discharge of said capacitor by means of said vacuum tube in response to variations of the voltage appearing across said capacitor as compared with a predetermined voltage.

14. The combination comprising a source of unidirectional voltage, an energy storage device, a circuit for charging said device from said source, a circuit for discharging said device, one of said circuits including a controlled electric valve, and the other of said circuits including a control vacuum tube, a source of signal voltage for controlling the frequency of operation of said circuit containing said controlled electric valve, and a control circuit for said control tube arranged to be responsive to variations in the voltage difference appearing across said device thereby to vary the conductivity of said vacuum tube.

15. The combination comprising a capacitor, a source of unidirectional voltage, a circuit for charging said capacitor, a circuit for discharging said capacitor, one of said circuits having a constant rate of operation, the other of said circuits having a variable rate of operation, said circuit having a constant rate of operation including a controlled electric valve having a control circuit arranged to be energized from a control signal, the other of said circuits including a vacuum tube having a control circuit arranged to be responsive to variations in the voltage difference appearing across said capacitor from a predetermined value, a direct current meter connected in series with said control vacuum tube, and an output circuit arranged to be energized by said capacitor.

16. A saw tooth generator comprising a source of unidirectional voltage, a capacitor, a circuit for charging said capacitor from said source of voltage, a circuit for discharging said capacitor, one of said circuits being arranged to produce a rapid change of voltage across said capacitor, the other of said circuits being arranged to produce a relatively gradual change of voltage across said capacitor, said rapid charge circuit including a controlled electric valve having a control circuit arranged to be energized in accordance with a square wave control signal, the voltages appearing across said controlled electric valve being such as to produce potential change aross said capacitor at a frequency harmonically related to said square wave generator, an isolating circuit for obtaining the voltage component from across said capacitor, said isolating circuit being connected to supply said voltage component to control the rate of operation of said other circuit in accordance with variations in the potential appearing across said capacitor, and an output circuit arranged to be energized in accordance with the voltage appearing across said capacitor.

17. The combination comprising a source of voltage, a capacitor, means for charging said capacitor from said source of voltage, means for discharging said capacitor, and means responsive to the voltage across said capacitor for varying the rate of discharge of said capacitor by said discharging means.

18. The combination comprising a capacitor, means for charging said capacitor in accordance with a source of signal energy, means for discharging said capacitor, and means responsive to the potential difference appearing across said capacitor for varying the rate of discharge of said capacitor by said discharging means.

19. The combination comprising a capacitor, means for periodically charging said capacitor including a signal source for determining the instant of the initiation of the charge of said capacitor, means for discharging said capacitor, said discharging means having a variable rate of operation, and means responsive to a variation in the potential difference appearing across said capacitor for varying the rate of discharge of said capacitor by said discharging means to maintain substantially constant the potential difference appearing across said capacitor.

20. The combination comprising a capacitor, a variable source of voltage for charging said capacitor, means for discharging said capacitor, and means responsive to the voltage difference appearing across said capacitor for controlling said variable voltage source so as to vary the rate of charging said capacitor.

21. The combination comprising a capacitor, a circuit for charging said capacitor including a variable current source, a discharging circuit for said capacitor, an output circuit across said capacitor, and means responsive to the amplitude of the voltage appearing across said output circuit for controlling said charging circuit so as to vary the rate of charging of said capacitor.

22. A sawtooth wave generating system operable in response to a controlling or synchronizing signal, comprising a capacitor, means for alternately charging and discharging said capacitor, thereby to produce a sawtooth voltage wave, and means responsive to the voltage across said capacitor for varying the rate of charge or discharge of said capacitor, so as to control the amplitude of the generated sawtooth wave to maintain synchronization and to maintain the amplitude of the wave substantially contsant despite variations in the frequency of the synchronizing signal.

MILLARD E. AMES, Jr.
DAVID E. SUNSTEIN.

REFERENCES CITED

The following references are of record in the file of this patent:

UNITED STATES PATENTS

| Number | Name | Date |
| --- | --- | --- |
| 1,978,461 | Hoover | Oct. 30, 1934 |
| 2,102,951 | Hackenberg | Dec. 21, 1937 |
| 2,126,243 | Busse | Aug. 9, 1938 |
| 2,153,217 | Mark | Apr. 4, 1939 |
| 2,265,290 | Knick | Dec. 9, 1941 |

OTHER REFERENCES

Ser. No. 464,750, De France (A. P. C.), published June 8, 1943.